(12) United States Patent
Kiriyama et al.

(10) Patent No.: US 6,636,035 B2
(45) Date of Patent: Oct. 21, 2003

(54) POSITION MEASURING DEVICE AND ERROR DETECTING METHOD FOR THE SAME, AND ELECTROMAGNETIC INDUCTION POSITION DETECTING DEVICE

(75) Inventors: Tetsuro Kiriyama, Kawasaki (JP); Toshiharu Miyata, Kawasaki (JP); Nobuyuki Hayashi, Kawasaki (JP); Kouji Sasaki, Kawasaki (JP); Yoshiaki Shiraishi, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 7 days.

(21) Appl. No.: 09/804,300

(22) Filed: Mar. 13, 2001

(65) Prior Publication Data

US 2002/0030484 A1 Mar. 14, 2002

(30) Foreign Application Priority Data

Mar. 13, 2000 (JP) .......................... 2000-068412
Mar. 13, 2000 (JP) .......................... 2000-068715

(51) Int. Cl.[7] .................. G01B 7/00; G01B 7/14; G01R 31/02
(52) U.S. Cl. .................. 324/207.17; 324/207.24; 324/500; 340/870.32; 702/58
(58) Field of Search .................. 324/207.12–207.19, 324/207.24, 500, 537, 546; 336/45, 130, 131; 340/635, 652, 653, 870.31–870.36; 318/653–661; 341/13–15; 702/58, 94, 116, 150; 33/708

(56) References Cited

U.S. PATENT DOCUMENTS

| | | | | |
|---|---|---|---|---|
| 5,150,115 A | * | 9/1992 | deJong et al. | 340/870.31 |
| 5,235,274 A | * | 8/1993 | Frazzini et al. | 324/207.12 |
| 5,777,468 A | * | 7/1998 | Maher | 324/207.18 |
| 5,804,963 A | * | 9/1998 | Meyer | 324/207.17 |
| 5,901,458 A | | 5/1999 | Andermo et al. | 324/207.24 X |
| 6,121,769 A | * | 9/2000 | Mukai et al. | 324/207.16 |
| 6,304,832 B1 | * | 10/2001 | Andermo et al. | 324/207.17 X |
| 6,400,138 B1 | * | 6/2002 | Andermo | 324/207.17 |

* cited by examiner

*Primary Examiner*—Gerard R. Strecker
(74) *Attorney, Agent, or Firm*—Oliff & Berridge, PLC (57) ABSTRACT

In an electronic caliper, a detecting circuit 112 detects displacement of a grid with respect to a scale, on the basis of a signal from a transducer 110. A CPU 114 displays the detected position on a display device 124. The CPU 114 performs error detection on the transducer, only when the relative speed of the grid with respect the scale is zero, or becomes equal to or smaller than a predetermined value. Since error detection is performed only at a predetermined timing, power consumption can be reduced.

40 Claims, 9 Drawing Sheets

POSITION MEASURING DEVICE AND ERROR DETECTING METHOD FOR THE SAME, AND ELECTROMAGNETIC INDUCTION POSITION DETECTING DEVICE

BACKGROUND OF THE INVENTION

1. Field of the Invention

The present invention relates to a position measuring device, and an error detecting method for the device, and more particularly to reduction of the power consumption of a position measuring device which detects displacement between two members.

The present invention relates also to an electromagnetic induction position detecting device which detects a relative position of two members with using electromagnetic coupling between the members, and more particularly to a method of detecting a fault such as a breakage of a coil.

2. Description of the Related Art

Measurement instruments such as an electronic caliper are widely used for measuring the thickness or other physical dimensions of an object in the manufacturing industry. A transducer is used as the principal component of such a measurement instrument.

Known transducers include a capacitive transducer and an inductive transducer. In the capacitive transducer, a transmitter electrode and a receiver electrode are disposed on a grid (slider), and signal electrode is disposed on a scale which is opposed to the grid. The transmitter and receiver electrodes on the grid are capacitively coupled with the signal electrode on the scale. A driving signal is supplied to the transmitter electrode, and a detection signal, which appears in the receiver electrode in accordance with the relative position between the grid and the scale, is processed by a signal processing circuit, thereby detecting the movement or position of the grid with respect to the scale.

On the other hand, in the inductive transducer, the relative position is detected on the basis of electromagnetic induction between a grid and a scale. For example, an exciting coil is disposed in the grid to generate a magnetic flux, thereby causing an induced current to be generated in a scale coil. The induced current generates a magnetic flux, so that an induced current (induced voltage) is generated in a detection coil disposed in the grid. The induced voltage generated in the detection coil is changed in accordance with relative displacement between the grid and the scale, and hence the displacement can be detected based on an induced-voltage signal.

In a measurement instrument of the related art, in order to ensure that the transducer surely operates, a CPU monitors a signal from the transducer at each sampling timing to judge whether the transducer is normal or not.

In the configuration in which the CPU is operated at each sampling timing to perform error detection for judging whether the transducer is normal or not, however, the power consumption is increased. When a battery is used as the power source, for example, there arises a problem in that the lifetime of the battery is shortened.

In the case where an inductive transducer is used, particularly, there is an advantage that the transducer is operable even in an environment of higher pollution as compared with the case where a capacitive transducer is used. However, the inductive transducer has a problem that the power consumption is large. Therefore, the above-mentioned increase of the power consumption: is not preferable.

In an electromagnetic induction position detecting device of the related art which uses electromagnetic coupling between a detection head (first member) and a scale (second member), the relative position of the scale with respect to the detection head is detected on the basis of electromagnetic induction between the detection head and the scale. More specifically, the electromagnetic induction position detecting device is configured by: the detection head in which a driving coil and a receiving coil are disposed; and the scale relatively moved with respect to the detection head in which magnetic modulating means such as closed loop coils is disposed. The magnetic modulating means modulates the magnetic flux generated by the driving coil. A primary changing magnetic flux which is generated when the driving coil is AC-driven is modulated by the scale, so that a magnetic pattern of a predetermined period is formed. The magnetic pattern is coupled with the receiving coil of the detection head. As a result, an induced voltage which is varied in accordance with movement of the scale appears in the receiving coil. When variations of the induced voltage are detected, it is possible to detect the relative movement distance of the scale with respect to the detection head. Alternatively, an absolute position detection is enabled in such a manner that a plurality of position detection tracks, in which magnetic patterns are formed in different periods, are disposed, the induced voltages are respectively detected by receiving coils of the tracks, and a phase difference between the induced voltages of the tracks is detected.

However, in the electromagnetic induction position detecting device, malfunction caused by coil breakage cannot be detected, and there is no means for, when the position is erroneously detected, informing the operator of the erroneous detection. Furthermore, it is difficult to stably and surely detect malfunction caused by breakage of the scale coil because a change due to such malfunction is very small in level.

SUMMARY OF THE INVENTION

It is a first object of the invention to provide a position measuring device and an error detecting method for the device, in which an error of a transducer can be detected at a low power consumption.

It is a second object of the invention to provide an electromagnetic induction position detecting device in which occurrence of a fault such as a breakage of a coil can be detected stably and surely, thereby enabling correct position detection to be performed.

In order to attain the first object, the position measuring device for detecting displacement between two members, according to the invention, comprises: a transducer which outputs an electric signal based on displacement between the two members; and a detecting section which, when a relative speed between the two members is equal to or smaller than a predetermined value, performs detection of malfunction of the transducer. In the device, detection of malfunction (error detection) of the transducer is performed not at a predetermined time interval, but at a timing when the relative speed is equal to or smaller than the predetermined value. Therefore, power consumption due to the detection of malfunction can be reduced.

Preferably, the detection of malfunction may be performed when the relative speed between the two members is zero. In the case where the relative speed is zero, it is particularly necessary to accurately detect the position. When the detection of malfunction of the transducer is performed at that position, therefore, the detection of malfunction can be efficiently performed, and the accuracy of the detection of position can be ensured.

For example, the transducer may be an inductive transducer. An inductive transducer itself consumes a relatively large power. When the power consumption due to the detection of malfunction is reduced, therefore, the ease of use of the inductive transducer is improved. In the case where the transducer is powered by a battery, the lifetime of the battery can be prolonged.

Alternatively, the transducer may be a transducer of an absolute, type electronic caliper which detects displacement from a predetermined reference position, i.e., the absolute position. In an incremental type electronic caliper, the displacement amount is sequentially detected. By contrast, in the absolute type electronic caliper, it is often that the absolute position of a grid is measured while the grid is made still with respect to a scale. When the detection of malfunction of the transducer is performed in the case where the relative speed of the grid is equal to or smaller than a predetermined value, or where the relative speed is zero, therefore, the timing of the position detection can be synchronized with that of the detection of malfunction, and hence the process can be efficiently conducted.

Preferably, the detecting section may detect the malfunction by using a ratio of an amplitude of the electric signal for detecting the displacement, to an amplitude in a normal condition. When the transducer itself becomes faulty, when the distance between the scale and the grid is changed, or when a foreign matter enters the transducer, the amplitude of the detection signal is changed from that in a normal condition. By using a ratio of the amplitude of the detection signal to that in a normal condition, therefore, malfunction of the transducer can be surely detected.

In order to attain the second object, a first electromagnetic induction position detecting device according to the invention comprises: a first member; a second member which is disposed to be opposed to the first member with a predetermined gap in a relatively movable manner; a driving coil which is disposed on the first member, and which generates a primary changing magnetic flux; a magnetic modulating section which is disposed on the second member, and which modulates the primary changing magnetic flux to generate a magnetic pattern that is changed in a predetermined spatial period and in a direction of the relative movement; polyphase receiving coil which is disposed on the first member to detect the magnetic pattern, and which is formed in the predetermined spatial period and with portions of the polyphase receiving coil being shifted in spatial phase from one another; a transmission signal generating section which supplies a transmission signal for generating the primary changing magnetic flux, to the driving coil; a position calculating section which performs a calculating process on polyphase reception signals that are received by the receiving coils, to detect a relative position of the second member with respect to the first member; and a fault detecting and informing section which detects occurrence of a fault from amplitude balance among the polyphase reception signals, and which informs of the occurrence.

According to the invention, it is noted that, when a fault such as a breakage of a coil occurs, the amplitude balance among the polyphase reception signals is lost, and therefore the fault is detected on the basis of the amplitude balance, and the fault occurrence is informed. Therefore, the operator is enabled by a very simple calculation to be informed of the occurrence of a fault. As a result, measurement is prevented from being conducted under an abnormal condition, so that correct measurement can be always performed.

A second electromagnetic induction position detecting device according to the invention comprises: a first member; a second member which is disposed to be opposed to the first member with a predetermined gap in a relatively movable manner; a plurality of position detection tracks of different spatial periods which are formed on the first and second members. Each of the tracks comprising: a driving coil which is disposed on the first member, and which generates a primary changing magnetic flux; a magnetic modulating section which is disposed on the second member, and which modulates the primary changing magnetic flux to generate a magnetic pattern that is changed in a spatial period inherent to the track and in a direction of the relative movement; and polyphase receiving coil which is disposed on the first member, which detects the magnetic pattern, and which is formed in the spatial period and with portions of the polyphase receiving coil being shifted in spatial phase from one another. The electromagnetic induction position detecting device also comprises: transmission signal generating section which supplies a transmission signal for generating the primary changing magnetic flux, to the driving coil of each of the tracks; a position calculating section which performs a calculating process on polyphase reception signals output from the receiving coil of each of the tracks, to detect an absolute position of the second member with respect to the first member; and a fault detecting and informing section which detects occurrence of a fault from amplitude balance among the polyphase reception signals of the tracks and which informs of the occurrence.

According to the invention, a loss of the amplitude balance of the polyphase reception signals which is caused among tracks by a fault such as a breakage of a coil is detected, and the fault occurrence is informed. Therefore, the operator is enabled by a very simple calculation to be informed of the occurrence of the fault. As a result, measurement is prevented from being conducted under an abnormal condition, so that correct measurement can be always performed. In the invention, moreover, even when the gap between the first and second members is varied, the change of the amplitude level appears in the same manner among the tracks. Therefore, the detection accuracy is not affected by such variation.

For example, the amplitude balance may be detected also from the sum of amplitudes of the polyphase reception signals. When the amplitude balance is detected from the sum of the squares of the amplitudes, i.e., the signal level, it is possible to detect a minute change of the accuracy with higher sensitivity. For example, the amplitude balance among the tracks may be monitored based on the difference or a ratio of the signal levels among the tracks. Alternatively, when a certain event occurs, the signal levels may be stored, and the levels of the polyphase reception signals of the tracks may be normalized by the stored signal levels. In the alternative, accurate fault detection can be always performed without being affected by dispersion of, or large difference between, signal levels among products.

DETAILED DESCRIPTION OF THE PREFERRED EMBODIMENT

Hereinafter, embodiments of the invention will be described with reference to the accompanying drawings.

Figure 1:
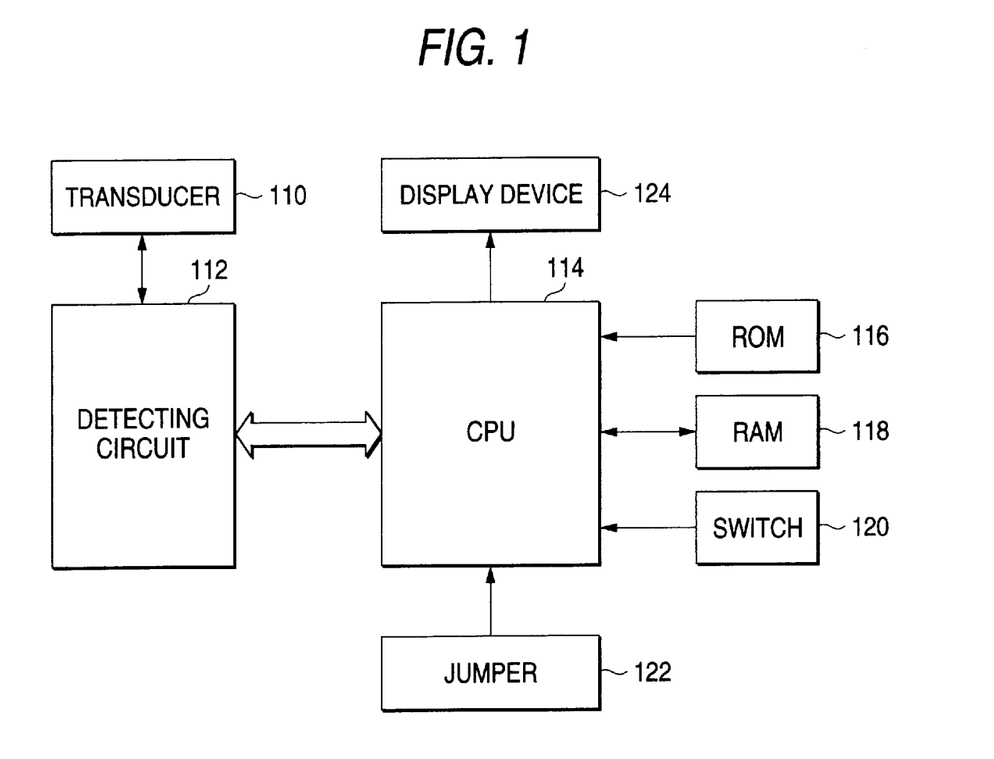
FIG. 1 is a configuration block diagram of a position measuring device of a first embodiment.

FIG. 1 is a configuration block diagram of an absolute position detecting (absolute type) electronic caliper of a first embodiment. A transducer 110 and a detecting circuit 112 are disposed as a detecting section, and a CPU 114, a ROM 116, a RAM 118, a switch 120, a jumper 122, and a display device 124 are disposed as a controlling section and a displaying section.

For example, an inductive transducer is used as the transducer 110. The transducer supplies an electric signal indicative of displacement of a grid (slider) with respect to a scale, to the detecting circuit 112. In order to detect displacement from a predetermined reference position (zero position), two scale coils of two different wavelengths (pitches) $\lambda 1$ and $\lambda 2$ are disposed, and the level difference between induced voltage signals of wavelengths $\lambda 1$ and $\lambda 2$ which are generated by induced currents in the scale coils is detected. The detecting circuit 112 receives the induced voltage signals from the transducer 110, detects the absolute position by using the above-mentioned level difference, and sends the detected data to the CPU 114.

The CPU 114 displays the detected data which are supplied from the detecting circuit 112, on the display device 124 such as an LCD. The ROM 116 stores process programs and data required for operating the CPU 114. The RAM 118 stores the detected data. When error detection is to be performed on the transducer 110, data in a normal condition are stored in the RAM 118, and the stored data are compared with the detected data. The switch 120 is a switch for setting the reference position, and the jumper 122 is used for determining the timing when the CPU 114 performs error detection on the transducer 110.

Figure 2:
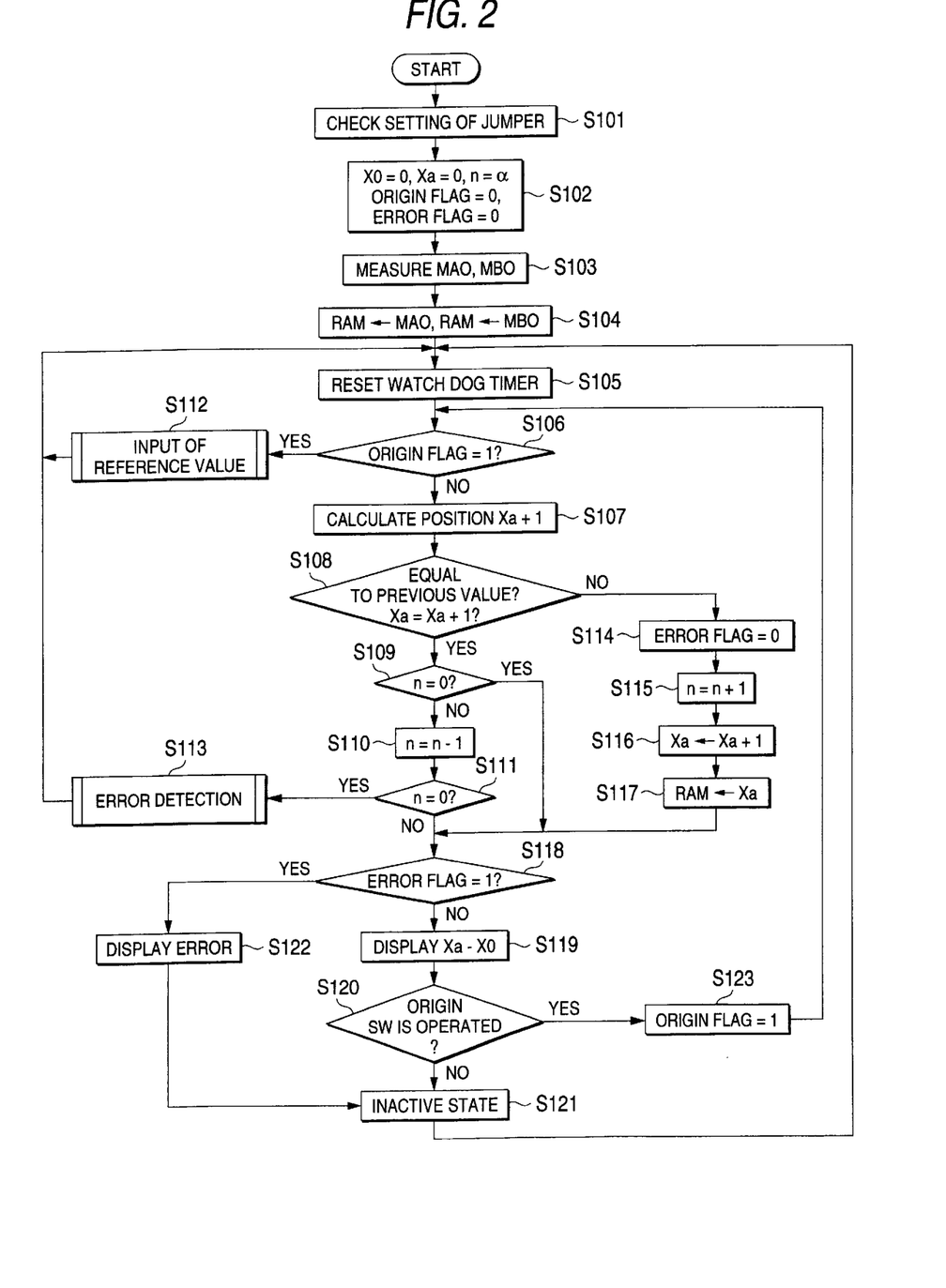
FIG. 2 is a flowchart of the whole process of the position measuring device of the first embodiment.

FIG. 2 is a flowchart of the whole process of the electronic caliper of the first embodiment. First, the timing of error detection is determined on the basis of the state of the jumper 122 which is preset or again set by the user (S101). In the embodiment, a parameter for judging whether the grid is still or not is set in the jumper 122 in order that error detection is performed on the transducer 110 when the grid is still with respect to the scale, i.e., when the relative speed between the scale and the grid is zero. The parameter $\alpha$ defines the number at which the absolute position of the grid detected by the transducer 110 and the detecting circuit 112 is judged to be unchanged. When the number at which the absolute position of the grid is unchanged reaches $\alpha$, it is judged that the grid is still, and error detection is then performed.

After the jumper is set, variables are initialized (S102). Among the variables, X direction is a direction along which the grid is displaced with respect to the scale, X0 is the predetermined reference position (zero position), Xa is the detected absolute position, n is a number variable for judging the still state, and origin Flag is a flag for setting a predetermined reference point. Furthermore, Error Flag is a flag which, when an error of the transducer 110 is detected, is set to 1.

After the variables are initialized, detection values MA0 and MB0 which serve as references in detection of an error of the transducer 110 are measured (S103). MA0 and MB0 are amplitudes of induced voltage signal of wavelengths $\lambda 1$ and $\lambda 2$ which are obtained immediately after the power is turned on. When the transducer 110 normally operates, the amplitudes are constant. By contrast, when an error occurs, such as when a foreign material enters between the grid and the scale, when the distance (air gap) between the grid and the scale is changed, or when the transducer 110 itself becomes faulty, the amplitudes are changed from the values in a normal condition. In the embodiment, therefore, reference amplitudes are measured immediately after the power is turned on, and the measured values are stored into the RAM 118 (S104).

Next, a watch dog timer for setting the CPU 114 to an inactive state is reset (S105), and it is judged whether origin Flag is 1 or not (S106). In the initialized state, the flag is set to 0, and hence the current grid position Xa+1 is further measured (S107). The measured position is stored into the RAM 118, and the CPU 114 judges whether the previous position Xa and the current position Xa+1 coincide with each other or not (S108). If the positions coincide with each other, it is judged whether n is 0 or not (S109). If n is not 0, n is decremented by 1 (S110), and it is further judged whether n becomes 0 or not (S111). When the number at which the previous position and the current position coincide with each other reaches $\alpha$ (in other words, when the still state is continued for a given time period), n becomes 0, and, when the number fails to reach $\alpha$, n>0. If n>0, Xa−X0 is calculated as the absolute position, the calculated position is displayed on the display device 124 (S119), and it is judged whether the Origin switch 120 is operated or not (S120). If the origin switch 120 is not operated, the CPU 114 is set to the inactive state (S121). The inactive state is continued for a predetermined time period t. Unlike the related art, at each sampling timing, the CPU 114 is not operated, but is set to the inactive state. Therefore, the power consumption can be suppressed.

By contrast, if the Origin switch 120 is operated, origin Flag is set to 1 (S123), and the control returns to the process of S106. In this process, since the flag is set from 0 to 1, MA0 and MB0 which are the reference values (reference amplitudes) used in the error detection are again input (S112). The process will be described later. After the reference values are again set, the watch dog timer is reset, and it is again judged whether the previous position and the current position coincide with each other or not, i.e., whether the grid is still for the given time period or not.

If it is judged in S105 that the previous position Xa does not coincide with the current position. Xa+1, or the grid is, moved with respect to the scale, the following process is conducted. If Error Flag is 1, the flag is reset to 0 (if Error Flag is 0, the flag is maintained as it is) (S114). Then, n is incremented by 1 (S115), and the current position is set as Xa (S116) and stored into the RAM 118 (S117). Alternatively, in the process of S115, n may be again set to $\alpha$.

When the number at which the previous position and the current position coincide with each other reaches, α (in other words, when the still state is continued for the given time period), n=0. Only when this state is attained, the CPU 114 implements a predetermined error detecting process (S113).

when an error of the transducer 110 is detected as a result of the error detecting process, Error flag is set to 1. In the operation of repeating the processes subsequent to S105 after the error detection, therefore, the result of judgment in S118 is YES, and an error indication is displayed (S122) without displaying the current position on the display device 124 (the process of S119 is not implemented). After the error indication is displayed, the CPU 114 is set to the inactive state (S121).

Figure 3:
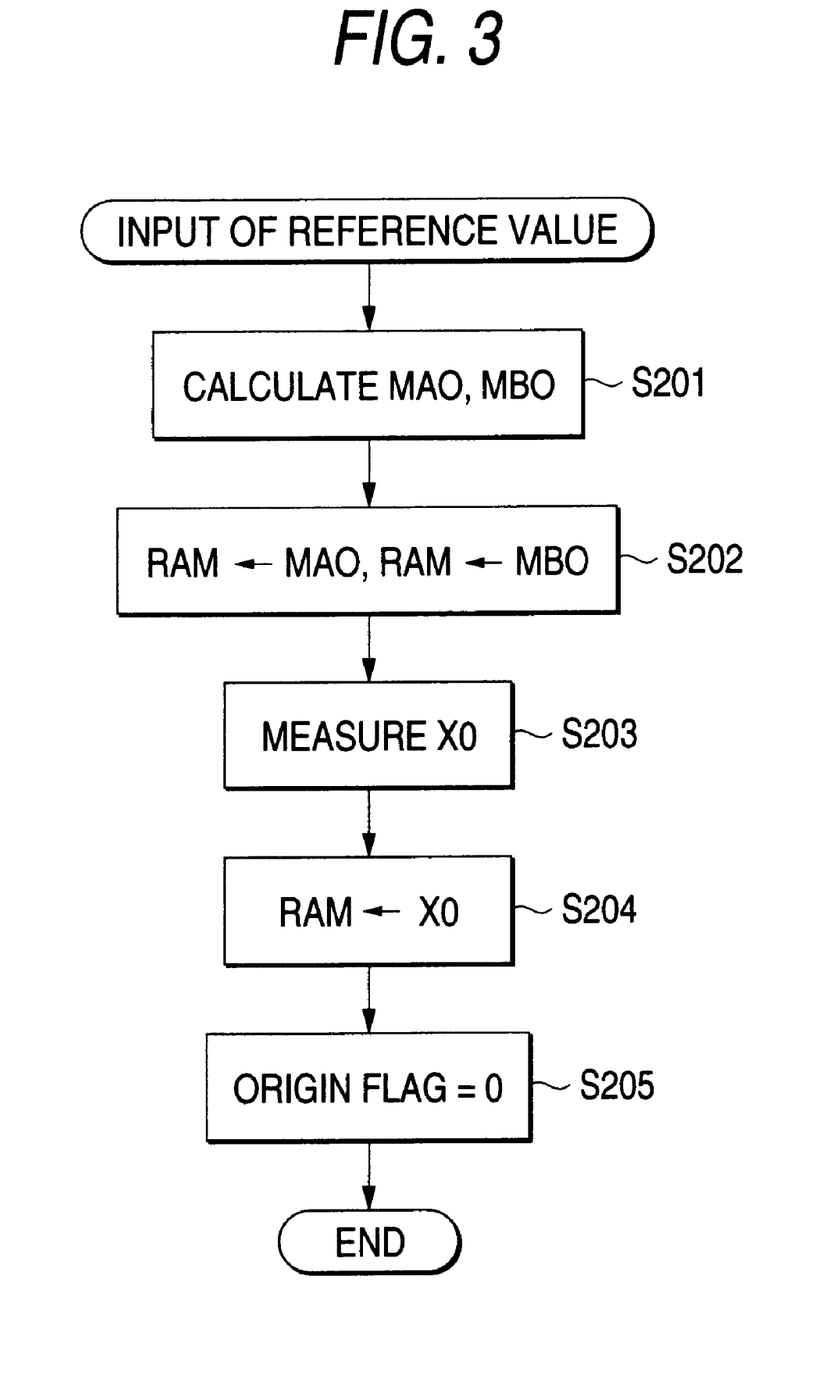
FIG. 3 is a flowchart of a process of inputting reference values in FIG. 2.

FIG. 3 is a detailed flowchart of the process of inputting the reference values (S112) in FIG. 2. If the Origin switch 120 is operated, the detecting circuit 112 calculates the current amplitudes of the induced voltage signals of wavelengths $\lambda 1$ and $\lambda 2$ (S201), and the calculated amplitudes are stored into the RAM 118 (S202). The calculation may be performed when the power is turned on, and the calculated amplitudes may overwrite the reference values stored in the RAM 118. Then, the position at the timing when the switch 120 is operated is stored as X0 into the RAM 118 (S203, S204). After the new reference position (zero position) and reference amplitudes MA0 and MB0 are stored, Origin Flag is again set to 0 (S205).

Figure 4:
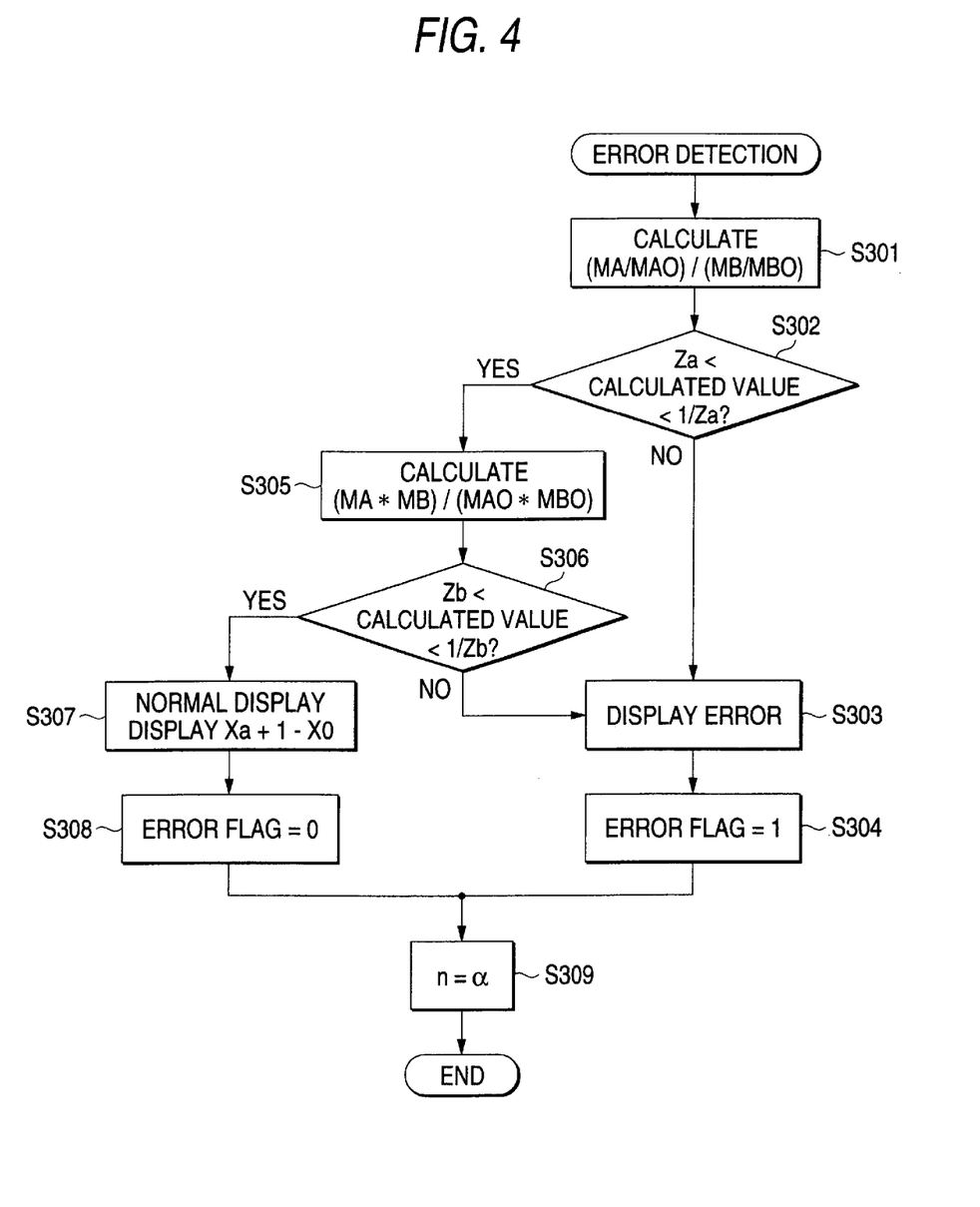
FIG. 4 is a flowchart of a process of detecting an error in FIG. 2.

FIG. 4 is a detailed flowchart of the error detection (S113) in FIG. 2. First, the CPU 114 calculates ratios MA/MA0 and MB/MB0 of the current amplitudes of MA and MB to the amplitudes MA0 and MB0 in the normal condition, and further calculates a ratio (MA/MA0)/(MB/MB0) of the amplitude ratios (S301). It is judged whether the ratio is within a predetermined range including 1 or not, more specifically, whether or not the calculated value is between Za and 1/Za where Za is a given value smaller than 1 (S302). When the transducer 110 normally operates, MA and MA0 are substantially equal to each other, and MB and MB0 are substantially equal to each other, so that the calculated value has a value which is similar to 1, or within the above-mentioned range. If the calculated value is not within the range, therefore, either MA or MB is not normal, and hence it is judged that an error occurs in the transducer 110. The CPU 114 displays an error indication on the display device 124 (S303).

Then, Error Flag is set from 0 to 1 (S304). When Error Flag is set to 1, the error indication is maintained in S122 of FIG. 2 as described above. After Error Flag is set to 1, n is returned to α (S309), and the control resumes the processes subsequent to S105 of FIG. 2.

By contrast, if the calculated value is within the above-mentioned range, it may be possible to judge that the transducer normally operates, but a case may be possible where both the amplitudes MA and MB are changed at a similar degree. In order to check the degrees of changes of MA and MB, therefore, the CPU 114 calculates (MA×HB)/(MA0×MB0) (S305). When MA and MB are changed at a similar degree, the degrees of changes are expanded as a result of the multiplication of MA×MB, and hence the calculated value is largely different from 1. Consequently, it is judged whether the calculated value is within a predetermined range or not, more specifically, whether or not the calculated value is between Zb and 1/Zb where Zb is a given value smaller than 1 (S306), If the calculated value is not within the range, the CPU 114 judges that an error occurs in the transducer 110, and displays an error indication on the display device. 124 (S303). In this case also, Error Flag is set from 0 to 1 (S304). If the calculated value is within the above-mentioned ranger the CPU 114 judges that the transducer 110 is normal, and displays a normal indication on the display device 124 (S307). Specifically, the current absolute position Xa+1−X0 is displayed on the display device 124 to inform the user that the transducer normally operates. If it is judged that the transducer is normal, Error flag is set to 0 (S308). After Error flag is set to 0, n is returned to α (S309), and the control resumes the processes subsequent to S105 of FIG. 2.

As described above, in the embodiment, the error detection is performed on the transducer 110, only when the grid is still. Therefore, power consumption due to the error detection can be reduced. In an electronic caliper which detects the absolute position, such as that of the embodiment, the timing when the grid is made still coincides with that when the user intends to detect the position. When error detection is performed on the transducer 110 when the grid is still, consequently, efficient error detection is enabled.

In the process of FIG. 2, alternatively, α may be set to 1, i.e., the error detecting process (S113) may be implemented immediately after the previous position and the current position coincide with each other. In order to prevent the error detecting process from being implemented plural times in the case where the still state is continued for a long time period, alternatively, n may be set to 0 in S309 (i.e., n is not returned to α), i.e., in the still state, the error detecting process is implemented only one time, and hence the power consumption can be further reduced.

The process of FIG. 4 may be performed in the following manner. After MA/MA0 and MB/MB0 are calculated, it is judged whether the values are within a predetermined range including 1 or not. If both MA/MA0 and MB/MB0 are within the predetermined range, it is judged that the transducer is normal, and, if not, it is judged that the transducer is faulty.

Figure 5:
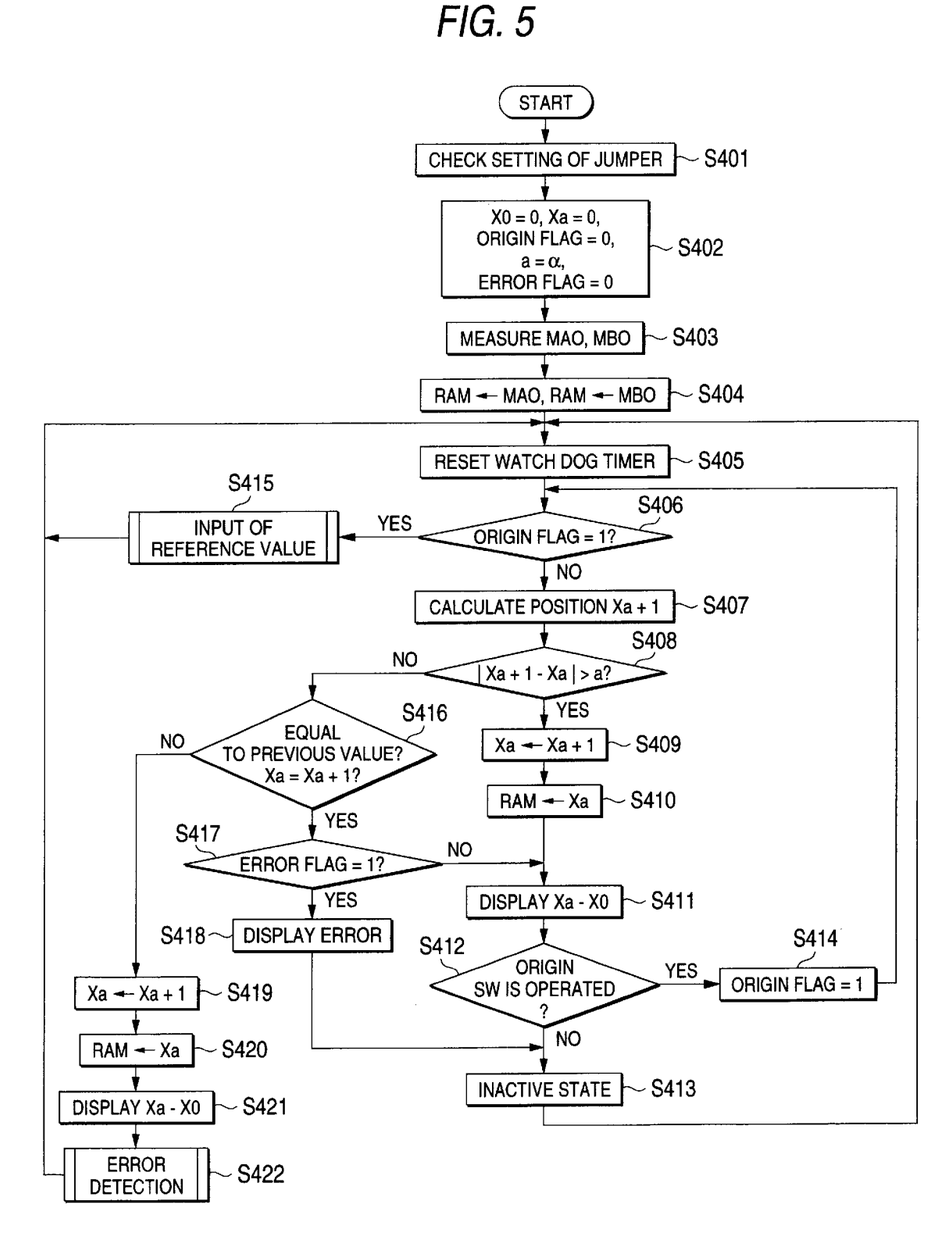
FIG. 5 is a flowchart of the whole process of a position measuring device of a second embodiment.

FIG. 5 is a flowchart of the process of an electronic caliper of a second embodiment. In the embodiment, error detection of the transducer 110 is not performed when the grid is still with respect to the scale, but performed when the relative speed of the grid is smaller than a predetermined value and it is expected that the grid will become soon still.

In the figure, the processes of S401 to S407 are identical with S101 to S107 of FIG. 2. After the current position Xa+1 is measured, it is judged that the degree of the difference between the current position Xa+1 and the previous position Xa is equal to or larger than a predetermined value a or not (5408). When the relative speed of the grid with respect to the scale is smaller than the predetermined value, the difference between the current position Xa+1 and the previous position Xa is equal to or smaller than the predetermined value a. When the relative speed is larger than the predetermined value, the difference exceeds the predetermined value a. If the difference exceeds the predetermined value a, therefore, the measured position is displayed on the display device 124, and the CPU 114 is set to the inactive state (S409 to S415). Since the relative speed is equal to or larger than the predetermined value, the position may not be displayed on the display device 124 in S411. Preferably, the value of a is set to, for example, about 10 to 20 μm when the period (sampling period) of the position measurement is 0.1 sec.

If the relative speed of the grid with respect to the scale is equal to or smaller than the predetermined value a (the result of judgment in S408 is NO), it is then judged whether the current position coincides with the previous position or not (S416).

At a timing when the speed of the grid is lowered to be equal to or smaller than the predetermined value, the previous value and the current value do not coincide with each other, and the result of judgment is NO, so that the current value is stored into the RAM (S419 and S420). The current absolute position is displayed on the display device 124, and the error detecting process is then implemented (S422). The error detecting process is identical with that shown in FIG. 4. In the embodiment, however, the variable n is not necessary, and hence the process of S309 may be omitted. In this case, preferably, the absolute position may not be displayed in S421, the error detection may be implemented in S422, and, if the transducer 110 is judged to be normal, the calculated absolute position may be displayed in S421 on the display device 124. During a period when the difference is equal to or smaller than the predetermined value a, the error detecting process is repeatedly implemented. When the predetermined value a is sufficiently small, the error detecting processes can be limited to be performed only one time or several times.

When the grid is still with respect to the scale, the result of judgment in S416 is YES, and Error Flag is checked (S417). In the case where it is once judged in the error detecting process that an error exists, Error Flag is set to 1, and, in the case where it is once judged that the transducer is normal, Error Flag is set to 0. If Error Flag is 1, the error indication is continued (S418). If Error Flag is 0, the transducer is normal, and hence the current position is displayed (S411).

As described above, in the first and second embodiments, only when the relative speed with respect to the scale is equal to or smaller than the predetermined value, the error detection is performed on the transducer 110. Therefore, power consumption due to the error detecting process can be reduced.

In the first and second embodiments, it is judged whether the relative speed of the grid with respect to the scale is equal to or smaller than the predetermined value or not, by comparing the difference between the current position and the previous position with the predetermined value, and, if it is judged that the relative speed is equal to or smaller than the predetermined value, error detection is performed. Alternatively, the judgement on whether the relative speed of the grid with respect to the scale is equal to or smaller than the predetermined value or not may be conducted by another method. For example, a speed sensor is disposed so as to directly detect the relative speed, or the relative speed is estimated from the pattern of an induced voltage signal. In the electronic calipers of the first and second embodiments, an inductive transducer is used as the transducer. However, the transducer is not restricted to an inductive transducers.

As described above, according to the position measuring device of the invention, power consumption due to the error detection can be reduced.

Next, the electromagnetic induction position detecting device of the invention will be described.

Figure 6:
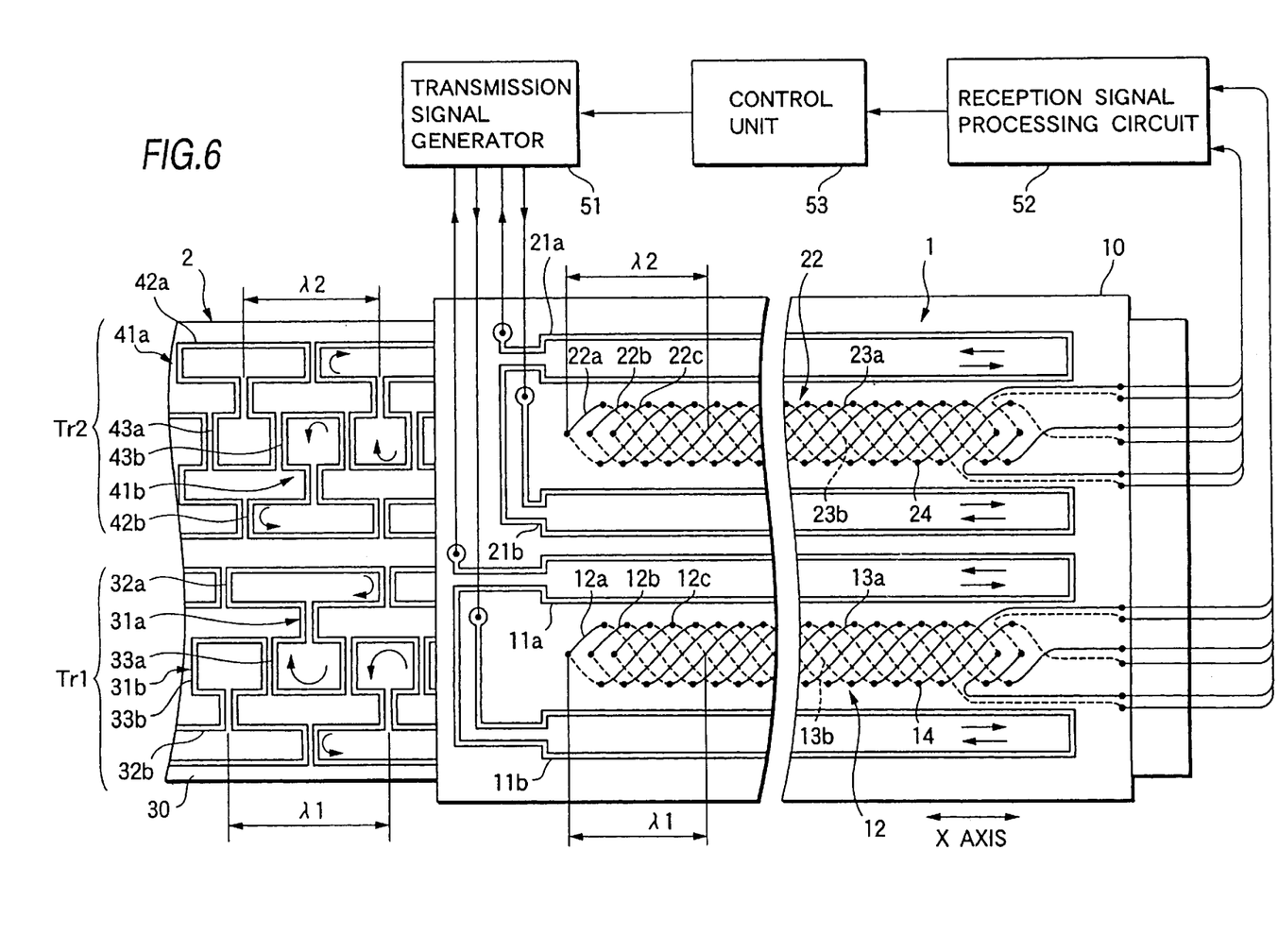
FIG. 6 is a diagram showing main portions of an electromagnetic induction position detecting device of a third embodiment.

FIG. 6 is a diagram showing main portions of an electromagnetic induction position detecting device of a third embodiment of the invention.

The device has a detection head 1 serving as a first member, and a scale 2 serving as a second member which are disposed so as to be opposed with a predetermined gap and relatively movable in the X-axis direction in the figure. The lower halves of the detection head 1 and the scale 2 in the figure constitute a first track Tr1, and the upper halves constitute a second track Tr2.

In the detection head 1, the portion of the first track Tr1 is configured by a pair of driving coils 11a and 11b which are formed on a head substrate 10, and a receiving coil 12 which is disposed between the driving coils 11a and 11b. The driving coils 11a and 11b have a rectangular pattern which elongates in the X-axis direction, and are connected to each other so that currents flow in opposite directions. For example, the current in the driving coil 11a flows in a counterclockwise direction, and that in the driving coil 11b flows in a clockwise direction. In the receiving coil 12, detection loops which are repeated in a period λ1 in the X-axis direction of the head substrate 10 are formed by positive and negative sinusoidal patterns of a fundamental period λ1. The sinusoidal patterns consist of patterns 13a and 13b formed on both the faces of the head substrate 10, and through wirings 14 connecting the patterns 13a and 13b with each other. In the embodiment, the receiving coil 12 is configured by three-phase receiving coils 12a, 12b, and 12c which are shifted in spatial phase in the X-axis direction. For example, the receiving coils 12a, 12b, and 12c are star-connected.

The second track Tr2 in the detection head 1 is configured in the same manner as the first track Tr1; except that the fundamental period is λ2 which is slightly shorter than λ1. Driving coils 21a and 21b of the second track Tr2 correspond to the driving coils 11a and 11b of the first track Tr1, receiving coils 22, 22a, 22b, and 22c of the second track Tr2 correspond to the receiving coils 12, 12a, 12b, and 12c of the first track Tr1, and patterns 23a and 23b and through wirings 24 of the second track Tr2 correspond to the patterns 13a and 13b and the through wirings 14 of the first track Tr1, respectively.

on the other hand, in the scale 2, the portion of the first track Tr1 is configured by alternately placing coupling coils 31a and 31b serving as a magnetic modulating section, on a plate-like resin substrate 30. The coupling coils 31a are closed loop coils which are arranged in the fundamental period λ1. Each of the coupling coils 31a has a first loop portion 32a which is to be magnetically coupled with the driving coil 11a of the detection head 1, and a second loop portion 33a which is to be magnetically coupled with the receiving coil 12 of the detection head 1. The coupling coils 31b are configured by closed loop coils which are arranged with being shifted in phase by 180° with respect to the coupling coils 31a. Each of the coupling coils 31b has a first loop portion 32b which is to be magnetically coupled with the driving coil 11b of the detection head 1, and a second loop portion 33b which is to be magnetically coupled with the receiving coil 12 of the detection head 1.

Also the second track Tr2 in the scale 2 is configured in the same manner as the first track Tr1, except that the fundamental period is λ2 which is slightly shorter than λ1. Coupling coils 41a and 41b of the second track Tr2 correspond to the coupling coils 31a and 31b of the first track Tr1, and first loop 42a and 42b and second loop 43a and 43b of the second track Tr2 correspond to the first loop portions 32a and 32b and the second loop portions 33a and 33b of the first track Tr1, respectively.

A single-phase AC transmission signal is supplied from a transmission signal generator 51 to the driving coils 11a, 11b, 21a, and 21b of the detection head 1. At certain timing, therefore, a current flows in a counterclockwise direction in the driving coils 11a and 21a, and in a clockwise direction in the driving coils 11b and 21b. As a result, a primary changing magnetic flux which is perpendicularly directed toward this side from the sheet is generated by the driving coils 11a and 21a, and a primary changing magnetic flux which is perpendicularly directed toward the opposite side from the sheet is generated by the driving coils 11b and 21b. The primary changing magnetic flux generated by the driving coils 11a and 21a cross the first loop portions 32a and 42a of the coupling coils 31a and 41a of the scale 2, respectively, so that a current in a clockwise direction is produced in the coupling coils 31a and 41a by electromagnetic induction. This causes a secondary changing magnetic flux which is perpendicularly directed toward the opposite side from the sheet to be generated in the second loop portions 33a and 43a. On the other hand, the primary changing magnetic flux generated by the driving coils 11b and 21b cross the first loop portions 32b and 42b of the coupling coils 31b and 41b of the scale 2, respectively, so that a current in a counterclockwise direction is produced in the coupling coils 31b and 41b by electromagnetic induction. This causes a secondary changing magnetic flux which is perpendicularly directed toward this side from the sheet to be generated in the second loop portions 33b and 43b. Therefore, magnetic patterns of the periods λ1 and λ2 are formed due to the secondary changing magnetic fluxes, the directions of which are alternately changed by the second loop portions 33a and 33b, and 43a and 43b. The secondary changing magnetic fluxes forming the magnetic patterns are magnetically coupled with the receiving coils 12 and 22, respectively.

Figure 7:
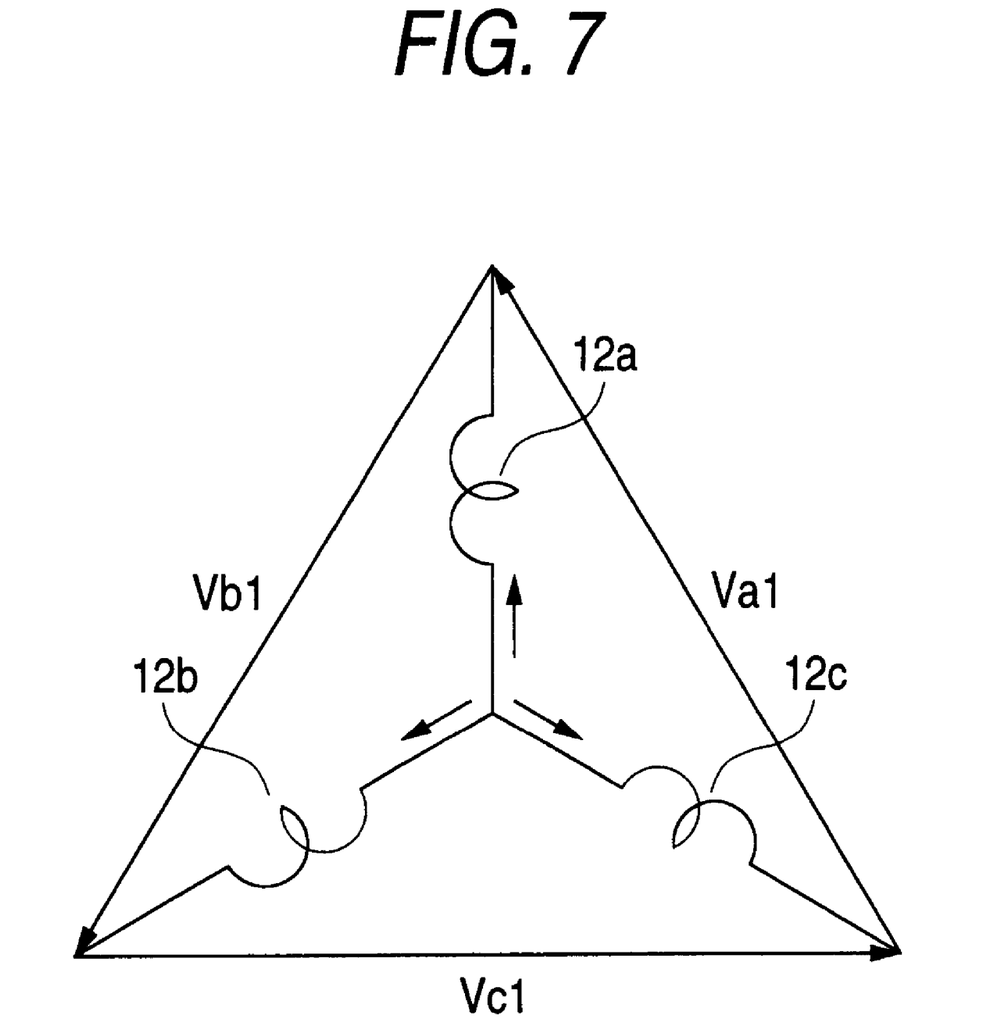
FIG. 7 is a diagram showing the connection state of receiving coils of a scale of the electromagnetic induction position detecting device of FIG. 6, and the phase voltages.
Figure 8A:
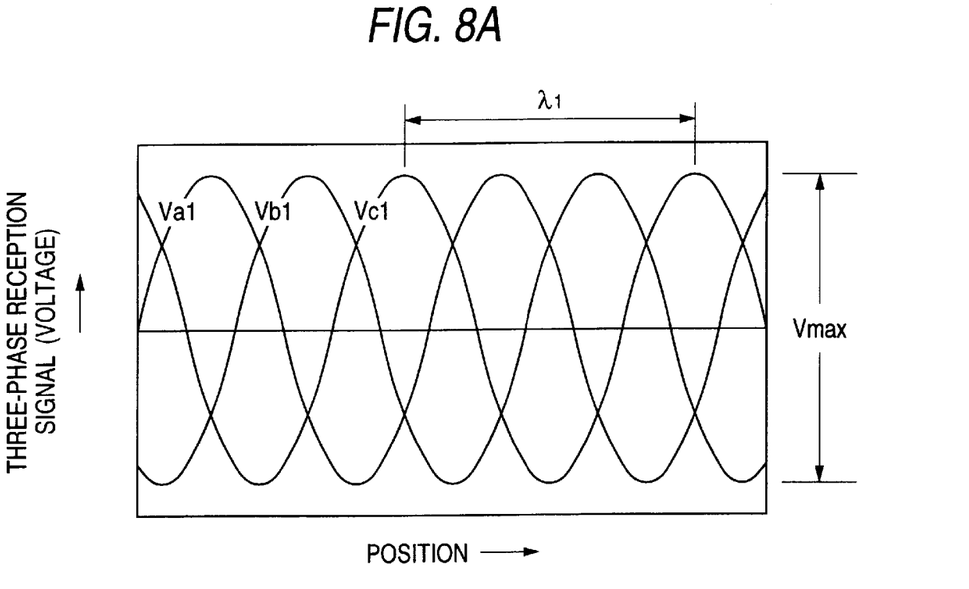
FIGS. 8A and 8B are waveform charts showing states of reception signals according to the position of the scale in the electromagnetic induction position detecting device of FIG. 6.
Figure 8B:
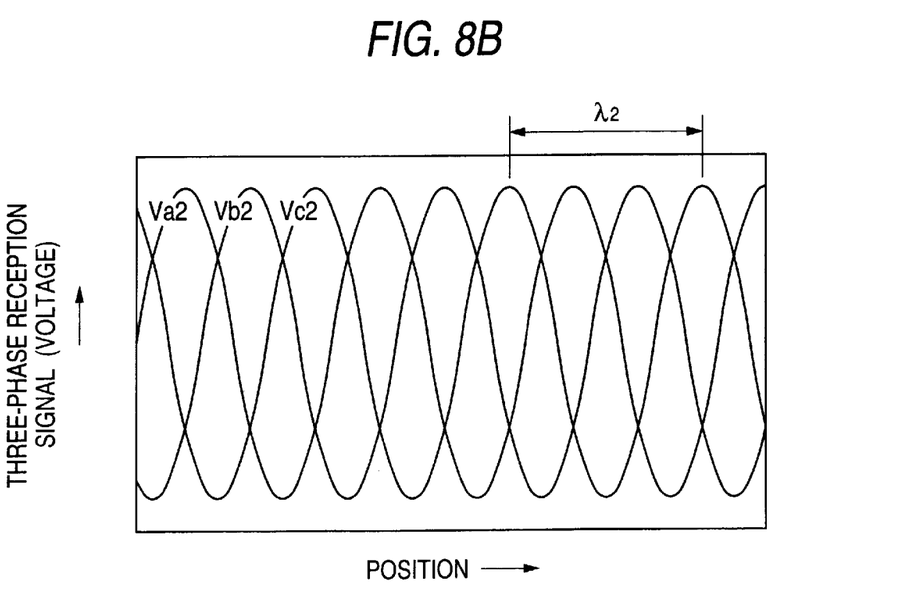

FIG. 7 shows relationships among the receiving coils 12a, 12b, and 12c of the first track Tr1 which are star-connected, and phase voltages Va1, Vb1, and Vc1. When the phase voltages of the second track Tr2 are similarly indicated as Va2, Vb2, and Vc2, as shown in FIG. 8, the voltages are changed along three-phase alternating waveforms of the phase difference of 120° in accordance with the relative position between the detection head 1 and the scale 2. The period of the change is λ1 in the first track Tr1, and λ2 in the second track Tr2.

Figure 9:
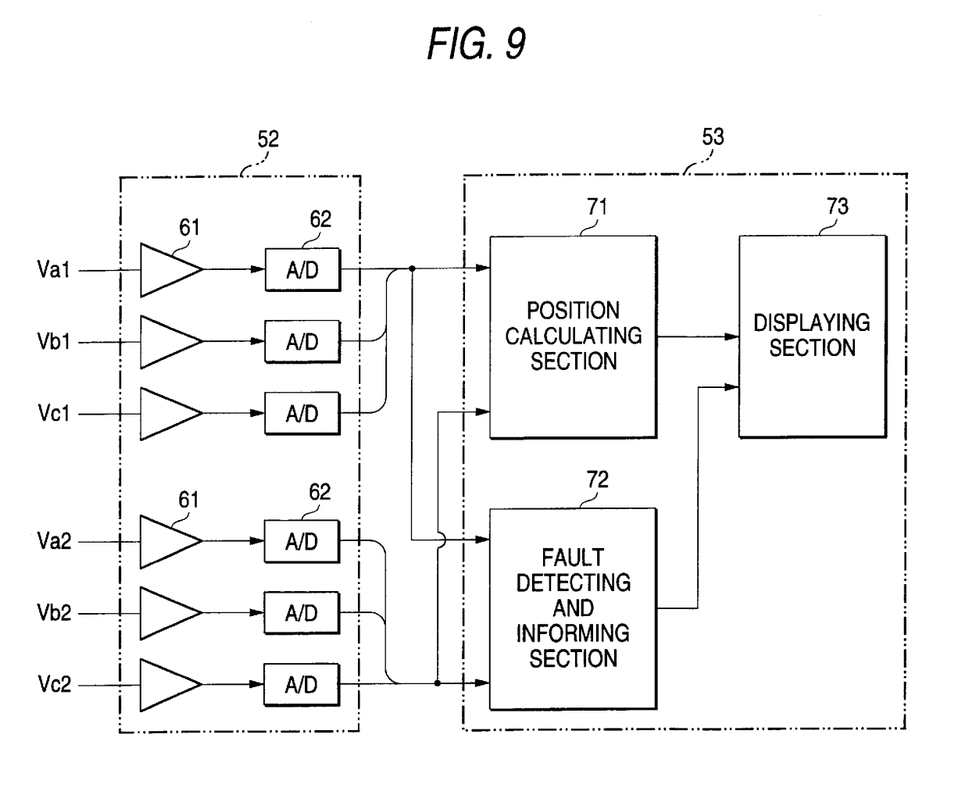
FIG. 9 is a block diagram showing the configuration of a reception signal processing circuit and a control unit in the device of FIG. 6.

The phase voltages are processed by a reception signal processing circuit 52. In a control unit 53, the absolute position of the detection head 1 with respect to the scale 2 is obtained, and fault detection is performed. FIG. 9 is a block diagram showing the configuration of main portions of the reception signal processing circuit 52 and the control unit 53. The phase voltages are amplified to a predetermined level by amplifiers 61 of the reception signal processing circuit 52, and then A/D-converted by A/D converters 62. The A/D-converted voltages are supplied to a position calculating section 71 and a fault detecting and informing section 72 of the control unit 53. In the position calculating section 71, for example, the following calculating process is performed to obtain phase angles θ1 and θ2 from the phase voltages Va1, Vb1, Vc1, Va2, Vb2, and Vc2, and then calculate the position. Specifically, the three-phase voltages Va1, Vb1, and Vc1, and Va2, Vb2, and Vc2 are converted into two-phase signals (X1, Y1) and (X2, Y2), and the phase angles θ1 and θ2 are calculated from arctangents of the two-phase signals based on the following expressions 1 and 2.

$$X1=(\tfrac{1}{3})\times(2Va1-Vb1+Vc1) \quad \text{[Ex. 1]}$$

$$Y1=(\tfrac{1}{3})\times(Vc1-Vb1)$$

$$\theta1=\tan^{-1}(Y1/X1)$$

$$X2=(\tfrac{1}{3})\times(2Va2-Vb2+Vc2) \quad \text{[Ex. 2]}$$

$$Y2=(\tfrac{1}{3})\times(Vc2-Vb2)$$

$$\theta2=\tan^{-1}(Y2/X2)$$

When the first and second tracks Tr1 and Tr2 have mutual relationships in which their, wave numbers are different from each other by just one, the wave number N of θ1 can be obtained from the phase difference Δθ=θ1−θ2 between θ1 and θ2. Furthermore, θ1 is interpolated to obtain the position of the minimum resolution. As a result, the absolute value of the position detection value can be obtained from the following expression 3:

$$\text{Absolute value}=(N+\theta1/2\pi)\times\lambda1 \quad \text{[Ex. 3]}$$

The absolute value is displayed on the displaying section 73.

The three-phase voltages of the tracks are supplied also to the fault detecting and informing section 72. The fault detecting and informing section 72 detects a fault such as a breakage of a coil by the methods (1) and (2) described below, and then gives an alarm. These methods may be singly used, or detection results which are obtained by plural ones of the methods may be subjected to a logical operation (for example, a logical sum) and a result of this operation may be used as the detection result.

(1) Simple Sum of Three-Phase Voltages

In a normal condition, ideally, a sum of the three-phase voltages Va1, Vb1, and Vc1, and Va2, Vb2, and Vc2 is zero. Therefore, a phenomenon that the sum is largely different from zero is set as alarm detection conditions. For example, 1% of the maximum Vmax of the voltage Va1 (or the maximum input range of the A/D converters 62) is set as the judgement criterion. Specifically, the judgement is performed in the following expression 4:

$$|Va1+Vb1+Vc1|>0.01\times Vmax \quad \text{[Ex. 4]}$$

or $$|Va2+Vb2+Vc2|>0.01\times Vmax$$

(2) Sum of Squares of Three-Phase Voltages
The followings are set $$M1=\sqrt{\{(Va1)^2+(Vb1)^2+(Vc1)^2\}}$$

$$M2=\sqrt{\{(Va2)^2+(Vb2)^2+(Vc2)^2\}} \quad \text{[Ex. 5]}$$

In this case, ideally, the maximum amplitudes of the signal levels M1 and M2 are constant, and the maximum value is $\sqrt{(3/2)}\times Vmax=1.225\ldots \times Vmax\ (=Mmax)$. When the square sum exceeds a certain judgement criterion with respect to Mmax, therefore, alarm sounding or an alarm indication is performed in the displaying section 73. Alternatively, as required, an alarm signal may be supplied from the fault detecting and informing section 72 to the outside by wire or wireless (including optical) communicating means which is not shown. When the judgement criterion is 50%, for example, a fault is informed when the following expression is attained:

$$M1<0.5\times Mmax \quad \text{[Ex. 6]}$$

or $$M2<0.5\times Mmax$$

or $$M1>1.1\times Mmax$$

or $$M1>1.1\times Mmax$$

In the methods described above, when the distance between the detection head 1 and the scale 2 is changed, the values are varied. In order to prevent the values from being varied, following methods (3) to (6) may be employed.

(3) Difference Between Signal Levels of Tracks

When ΔM=M1−M2 is used and its change exceeds a certain judgement criterion, an alarm is given.

(4) Ratio of Signal Levels of Tracks

When RM=M1/M2 is used and its change exceeds a certain judgement criterion, an alarm is given.

In (3) and (4) above, when the signal levels M1 and M2 are made largely different from each other by, for example, dispersion of signal levels among products or in production, the judgement criterion must be set for each of the products. To comply with this, when a certain event occurs, the signal levels may be stored. When the difference or ratio of values which are obtained by normalizing the signal levels M1 and M2 by the stored signal levels exceeds a certain judgement criterion, an alarm is given. According to this configuration, the signal levels are normalized, and it is not required to set the judgement criterion for each of products. Therefore, the number of adjustment steps can be reduced.

For example, events which are suitable for capturing the signal levels are as follows:

(1) when a caliper, a micrometer, or the like is zero-set;

(2) when a linear gauge is preset;

(3) when the mechanical origin based on an external contact switch or the like is detected in a linear scale;

(4) when a battery is set in a battery-powered apparatus;

(5) when the operation of an apparatus having an auto-power-off function is activated;

(6) when an externally-powered apparatus is powered on;

(7) when an alarm (fault indication) is cancelled; and (8) when an internal timer of an apparatus counts a predetermined time period.

Methods in which data captured when an event occurs are used will be described.

(5) Difference of Relative Signal Levels

Signal levels M1 and M2 when an event occurs are indicated by Mr1 and Mr2. When (M1/Mr1)−(M2/Mr2) exceeds a certain judgement criterion, an alarm is given. Ideally, this value is zero. When the judgement criterion is 5%, for example, the judgment expression is as follows:

|(M1/Mr1)−(M2/Mr2)|>0.05      [Ex. 7]

(6) Ratio of Relative Signal Levels

When (M1/Mr1)/(M2/Mr2) exceeds a certain judgement criterion, an alarm is given. Ideally, this value is 1. When the judgement criterion is 5%, for example, the judgment expression is as follows:

(M1/Mr1)/(M2/Mr2)>1.05      [Ex. 8]

or (M1/Mr1)/(M2/Mr2)<0.95

As described above, according to the electromagnetic induction position detecting device of the invention, a fault is detected on the basis of the amplitude balance of the polyphase reception signals, and a fault indication is then conducted. Therefore, the operator is enabled by a very simple calculation to be informed of the occurrence of a fault, and an effect that measurement is prevented from being conducted under an abnormal condition, so that correct measurement can be always performed is attained.

In the electromagnetic induction position detecting device of the invention, the fault detecting and informing section may be configured so that, in the same manner as the detecting section in the first and second embodiments, the error detecting process is performed when the relative speed between the detection head and the scale is equal to or smaller than a predetermined value. In this way, fault detection is performed not at a predetermined time interval, but at a timing when the relative speed is equal to or smaller than the predetermined value. Therefore, power consumption due to the fault detecting process can be reduced.

What is claimed is:

1. A position measuring device for detecting displacement between two members, said device comprising:

a transducer that outputs an electric signal based on the displacement between the two members; and a detecting section that performs a detection of malfunction of said transducer only when a relative speed between the two members is equal to or smaller than a predetermined value, wherein the relative speed is determined using the electric signal output to the detecting section.

2. The position measuring device according to claim 1, wherein said detecting section performs the detection of malfunction when the relative speed between the two members is zero.

3. The position measuring device according to claim 2, wherein said detecting section detects malfunction of said transducer on the basis of a ratio W of an amplitude of the electric signal output from said transducer, to an amplitude of the electric signal in a normal condition.

4. The position measuring device according to claim 3, wherein said detecting section detects malfunction of said transducer when the amplitude ratio W satisfies a following expression:

$$Za > W \text{ or } W > 1/Za,$$

where Za is a value which is smaller than 1.

5. The position measuring device according to claim 4, wherein said transducer is an inductive transducer.

6. The position measuring device according to claim 4, wherein said transducer is a transducer of an electronic caliper which detects displacement from a predetermined reference position.

7. The position measuring device according to claim 5, wherein said transducer is a transducer of an electronic caliper which detects displacement from a predetermined reference position.

8. The position measuring device according to claim 5, wherein:

said inductive transducer has:

a driving coil, which is disposed on a first member of said two members, that generates a primary changing magnetic flux, a magnetic modulating section, which is disposed on a second member of said two members, that modulates the primary changing magnetic flux to generate a magnetic pattern that is changed in a predetermined spatial period and in a direction of the relative movement, and polyphase receiving coil, which is disposed on said first member and formed in a predetermined spatial period and with portions of the polyphase receiving coil being shifted in spatial phase from one another, that detects the magnetic pattern and that outputs polyphase reception signals; and said detecting section detects an occurrence of a fault of said transducer based on an amplitude balance among the polyphase reception signals output from said polyphase receiving coil, and informs of the occurrence.

9. The position measuring device according to claim 1, wherein said transducer is an inductive transducer.

10. The position measuring device according to claim 9, wherein said transducer is a transducer of an electronic caliper which detects displacement from a predetermined reference position.

11. The position measuring device according to claim 9, wherein:

said inductive transducer has:
a driving coil, which is disposed on a first member of said two members, that generates a primary changing magnetic flux,
a magnetic modulating section, which is disposed on a second member of said two members, that modulates the primary changing magnetic flux to generate a magnetic pattern that is changed in a predetermined spatial period and in a direction of the relative movement, and
polyphase receiving coil, which is disposed on said first member and formed in a predetermined spatial period and with portions of the polyphase receiving coil being shifted in spatial phase from one another, that detects the magnetic pattern and that outputs polyphase reception signals: and
said detecting section detects an occurrence of a fault of said transducer based on an amplitude balance among the polyphase reception signals output from said receiving coil, and informs of the occurrence.

12. The position measuring device according to claim 1, wherein said transducer is a transducer of an electronic caliper which detects displacement from a predetermined reference position.

13. The position measuring device according to claim 1, wherein said detecting section detects malfunction of said transducer on the basis of a ratio W of an amplitude of the electric signal output from said transducer, to an amplitude of the electric signal in a normal condition.

14. The position measuring device according to claim 13, wherein said detecting section detects the malfunctions of said transducer when the amplitude ratio W satisfies a following expression:

$$Za > W \text{ or } W > 1/Za,$$

where Za is a value which is smaller than 1.

15. The position measuring device according to claim 14, wherein said transducer is an inductive transducer.

16. The position measuring device according to claim 15, wherein said transducer is a transducer of an electronic caliper which detects displacement from a predetermined reference position.

17. The position measuring device according to claim 15, wherein:

said inductive transducer has:
a driving coil, which is disposed on a first member of said two members, that generates a primary changing magnetic flux,
a magnetic modulating section, which is disposed on a second member of said two members, that modulates the primary changing magnetic flux to generate a magnetic pattern that is changed in a predetermined spatial period and in a direction of the relative movement, and
polyphase receiving coil, which is disposed on said first member and formed in a predetermined spatial period and with portions of the polyphase receiving coil being shifted in spatial phase from one another, that detects the magnetic pattern and that outputs polyphase reception signals; and
said detecting section detects an occurrence of a fault of said transducer based on amplitude balance among the polyphase reception signals output from said receiving coil, and informs of the occurrence.

18. An electromagnetic induction position detecting device having a transducer, comprising:

a first member;
a second member disposed to be opposed to said first member in a relatively movable manner;
a driving coil, which is disposed on said first member, that generates a primary changing magnetic flux;
a magnetic modulating section, which is disposed on said second member, that modulates the primary changing magnetic flux to generate a magnetic pattern that is changed in a predetermined spatial period and in a direction of the relative movement;
polyphase receiving coil, which is disposed on said first member and formed in a predetermined spatial period and with portions of the polyphase receiving coil being shifted in spatial phase from one another, that detects the magnetic pattern and that outputs polyphase reception signals; and
a fault detecting and informing section that detects an occurrence of a fault within the transducer based on an amplitude balance among the polyphase reception signals output from said receiving coil, and that informs of the occurrence.

19. The electromagnetic induction position detecting device according to claim 18, wherein said fault detecting and informing section detects the occurrence of the fault when a sum of amplitudes of the polyphase reception signals exceeds a predetermined value, and informs of the occurrence.

20. The electromagnetic induction position detecting device according to claim 18, wherein said fault detecting and informing section detects the occurrence of the fault when a sum of squares of amplitudes of the polyphase reception signals exceeds a predetermined value, and informs of the occurrence.

21. The electromagnetic induction position detecting device according to claim 18, wherein the polyphase reception signals are three-phase reception signals which are obtained by star-connecting said receiving coil.

22. An electromagnetic induction position detecting device having a transducer, comprising:

a first member;
a second member disposed to be opposed to said first member in a relatively movable manner;
a plurality of position detection tracks of different spatial periods which are formed on said first and second members, each of said tracks comprising:
a driving coil, which is disposed on said first member, that generates a primary changing magnetic flux,
a magnetic modulating section, which is disposed on said second member, that modulates the primary changing magnetic flux to generate a magnetic pattern that is changed in a spatial period inherent to said track and in a direction of the relative movement, and polyphase receiving coil, which is disposed on said first member and formed in the spatial period and with portions of the polyphase receiving coil being shifted in spatial phase from one another, that detects the magnetic pattern and that outputs polyphase reception signals;

a transmission signal generating section that supplies a transmission signal that generates the primary changing magnetic flux to said driving coil of each of said tracks; and a fault detecting and informing section that detects an occurrence of a fault within the transducer based on an amplitude balance of polyphase reception signals among said tracks, and that informs of the occurrence.

23. The electromagnetic induction position detecting device according to claim 22, wherein said fault detecting and informing section judges that the fault occurs when a difference of signal levels of the polyphase reception signals among said tracks exceeds a predetermined value, and informs of the occurrence.

24. The electromagnetic induction position detecting device according to claim 22, wherein said fault detecting and informing section judges that the fault occurs when a ratio of signal levels of the polyphase reception signals among said tracks exceeds a predetermined value, and informs of the occurrence.

25. The electromagnetic induction position detecting device according to claim 22, wherein said fault detecting and informing section stores, as reference signal levels, signal levels of the polyphase reception signals of said tracks at a timing when an event occurs, and detects the occurrence of the fault from signal levels of the polyphase reception signals of said tracks which are normalized by the reference signal levels, and informs of the occurrence.

26. The electromagnetic induction position detecting device according to claim 25, wherein said fault detecting and informing section detects a difference of the normalized signal levels of the polyphase reception signals among said tracks.

27. The electromagnetic induction position detecting device according to claim 22, wherein said fault detecting and informing section detects that a ratio of the normalized signal levels of the polyphase reception signals among said tracks exceeds a predetermined range.

28. The electromagnetic induction position detecting device according to claim 22, wherein the polyphase reception signals are three-phase reception signals which are obtained by star-connecting said receiving coil.

29. The electromagnetic induction position detecting device according to claim 23, wherein the signal level of each track is a sum of squares of polyphase reception signals in each track.

30. The electromagnetic induction position detecting device according to claim 24, wherein the signal level of each track is a sum of squares of polyphase reception signals in each track.

31. The electromagnetic induction position detecting device according to claim 25, wherein the signal level of each track is a sum of squares of polyphase reception signals in each track.

32. The electromagnetic induction position detecting device according to claim 27, wherein the signal level of each track is a sum of squares of polyphase reception signals in each track.

33. A method for detecting an error in a position measuring device having a transducer that detects a displacement of a second member with respect to a first member, said method comprising:

outputting an electric signal from the transducer based on the displacement of said second member with respect to said first member;

detecting a relative speed of said second member with respect to said first member on the basis of the electric signal; and performing detection of malfunction of said transducer when the detected relative speed is equal to or smaller than a predetermined value.

34. The method according to claim 33, wherein performing detection of malfunction comprises performing detection of malfunction when the relative speed of said second member with respect to said first member is zero.

35. The method according to claim 33, wherein performing detection of malfunction comprises detecting an occurrence of a malfunction of said transducer on the basis of a ratio W of an amplitude of the output electric signal to an amplitude of an electric signal in a normal condition.

36. The error detecting method according to claim 35, wherein detecting an occurrence of a malfunction comprises judging that said transducer malfunctions when the amplitude ratio W satisfies a following expression:

$$Za > W \text{ or } W > 1/Za$$

where Za is a value which is smaller than 1.

37. The electromagnetic induction position detecting device according to claim 18, further comprising a transmission signal generating section that supplies a transmission signal, usable to generate the primary changing magnetic flux, to said driving coil.

38. The electromagnetic induction position detecting device according to claim 18, further comprising a position determining section that determines a relative position of said second member with respect to said first member based on polyphase reception signals output from said receiving coil.

39. The electromagnetic induction position detecting device according to claim 22, wherein a predetermined gap is provided between said first member and said second member.

40. The electromagnetic induction position detecting device according to claim 22, further comprising a position determining section that determines an absolute position of said second member with respect to said first member based on polyphase reception signals output from said receiving coil of each of said tracks.

* * * * *